(12) United States Patent
Chatwin et al.

(10) Patent No.: US 8,332,269 B2
(45) Date of Patent: Dec. 11, 2012

(54) SYSTEM AND METHOD FOR GENERATING TARGET BIDS FOR ADVERTISEMENT GROUP KEYWORDS

(75) Inventors: Richard Edward Chatwin, Sunnyvale, CA (US); Ayman Omar Farahat, San Francisco, CA (US); Scott Campbell Johnston, San Francisco, CA (US); Matthew McEachen, El Granada, CA (US)

(73) Assignee: Adchemy, Inc., Foster City, CA (US)

( * ) Notice: Subject to any disclaimer, the term of this patent is extended or adjusted under 35 U.S.C. 154(b) by 1605 days.

(21) Appl. No.: 11/477,194

(22) Filed: Jun. 27, 2006

(65) Prior Publication Data
US 2008/0010144 A1 Jan. 10, 2008

(51) Int. Cl.
*G06Q 30/00* (2012.01)
(52) U.S. Cl. .......... 705/14.71; 709/224; 705/14.41; 705/14.45; 705/14.46; 705/14.55; 705/14.69; 705/14.73
(58) Field of Classification Search .......... 705/1–50; 707/1–30; 709/1–20, 224; 1/1
See application file for complete search history.

(56) References Cited

U.S. PATENT DOCUMENTS

| | | | | |
|---|---|---|---|---|
| 6,606,608 B1 * | 8/2003 | Bezos et al. | ............. | 705/36 R |
| 6,907,566 B1 * | 6/2005 | McElfresh et al. | ............. | 715/210 |
| 2002/0099605 A1 * | 7/2002 | Weitzman et al. | ............. | 705/14 |
| 2005/0097204 A1 * | 5/2005 | Horowitz et al. | ............. | 709/223 |
| 2005/0144064 A1 * | 6/2005 | Calabria et al. | ............. | 705/14 |
| 2005/0149396 A1 | 7/2005 | Horowitz | | |
| 2006/0068372 A1 | 3/2006 | Jones | | |
| 2006/0282328 A1 * | 12/2006 | Gerace et al. | ............. | 705/14 |
| 2007/0100795 A1 | 5/2007 | Davies | | |
| 2008/0103892 A1 | 5/2008 | Chatwin | | |

OTHER PUBLICATIONS

Office Action for U.S. Application No. 11/590043 Feb. 22, 2012.
Office Action for U.S. Application No. 11/590043 Sep. 4, 2009.
Kivinen, Jyrki et al "Exponentiated Gradient Versus Gradient Descent for Linear near Predictors", revisdd Dec. 7, 1995, Computer Engineering & Information Sciences, Univ. Of California, Santa Cruz, Ca 95064 Jun. 21, 1994.

* cited by examiner

*Primary Examiner* — Sun Li
(74) *Attorney, Agent, or Firm* — Baker Botts L.L.P.

(57) ABSTRACT

The present invention is directed towards systems and methods for generating bids for one or more keywords and advertisement groups. The method of the present invention comprises generating a data set with one or more entries, a given entry identifying one or more advertising metric values associated with an advertisement group and keyword. One or more keywords are selected from the one or more entries in the data set, and a bid is generated for the one or more selected keywords using the one or more advertising metric values associated with the one or more selected keywords. The one or more advertising metric values of the one or more entries associated with a given advertisement group exclusive of the one or more advertising metric values associated with the one or more selected keywords is aggregated. A bid is generated for the one or more advertisement groups using the one or more aggregated advertising metric values associated with the one or more advertisement groups.

20 Claims, 5 Drawing Sheets

SYSTEM AND METHOD FOR GENERATING TARGET BIDS FOR ADVERTISEMENT GROUP KEYWORDS

COPYRIGHT NOTICE

A portion of the disclosure of this patent document contains material that is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

FIELD OF THE INVENTION

The invention disclosed herein relates generally to systems and methods for generating bids for keywords. More specifically, the present invention relates to generating target bids for one or more keywords associated with one or more advertisement groups comprising one or more advertisements.

BACKGROUND OF THE INVENTION

Advertisements are commonly used on the Internet to promote various products and services. Advertisements may comprise banner advertisements, links to web pages, images, video, text, etc. The various advertisements used to promote products on the Internet may be displayed according to a variety of formats, such as in conjunction with a ranked result set in response to a query, embedded in a web page, a pop-up, etc. The advertisements displayed to a user of a client device may be selected, redirecting the user to a website providing the product or service advertised.

Client devices, communicatively coupled to a network such as the Internet, are capable of searching for content, such as web pages, documents, etc., using one or more queries comprising one or more keywords. The one or more keywords comprising the queries with which users search for content items may be used to retrieve one or more advertisements associated with the one or more keywords.

Advertisers may bid on the one or more keywords, including groups of related keywords, which are referred to as advertisement groups. A search engine may utilize the bids associated with the one or more keywords to select one or more advertisements for distribution to client devices. Advertisers participating in such an auction-based system may face the daunting challenge of managing and optimizing the ongoing bid process, for example, managing and optimizing bids for thousands or millions of keywords or groups of keywords (e.g., advertisement groups).

In order to overcome shortcomings associated with existing advertisement bid management techniques, embodiments of the present invention provide systems and methods for generating target bid amounts for one or more keywords.

SUMMARY OF THE INVENTION

The present invention is directed towards systems and methods for generating bids for one or more keywords and advertisement groups. The method of the present invention comprises generating a data set with one or more entries, a given entry identifying one or more advertising metric values associated with an advertisement group and keyword. According to one embodiment of the invention, the generated data set identifies a frequency with which one or more users selected one or more advertisements associated with a given keyword, and a frequency with which one or more advertisements associated with a given keyword were displayed to one or more users. A data set may further identify a frequency with which one or more users viewed a web page corresponding to an advertisement associated with a given keyword, as well as the frequency with which a user performed one or more actions with respect to a web page corresponding to an advertisement associated with a given keyword, wherein an action may comprise a conversion, a lead, or the selection of one or more advertisements, etc. Additionally, a data set may identify a cost associated with a given keyword, wherein a cost may comprise the cost associated with a user selection of an advertisement associated with the keyword, the cost associated with the display of an advertisement associated with the keyword, or the cost associated with an action taken by a user with respect to an advertisement associated with the keyword. Generating a data set may further comprise identifying a pair of successive occasions on which a user performed an action with respect to a web page corresponding to an advertisement associated with a given keyword, as well as the frequency with which the web page corresponding to the advertisement associated with the keyword was viewed by one or more users during the interval between the aforementioned pair of successive occasions.

One or more of the keywords are selected from the one or more entries in the data set. The one or more keywords may be selected according to one or more advertising metric values associated with the one or more keywords. According to one embodiment of the invention, the one or more keywords selected comprise the one or more keywords with one or more advertising metric values exceeding a threshold. Alternatively, or in conjunction with the foregoing, the one or more keywords selected comprise the N keywords with the greatest advertising metric values for one or more advertising metrics.

A bid is generated for the one or more selected keywords using the one or more advertising metric values associated with the one or more selected keywords. According to one embodiment of the invention, generating a bid comprises calculating a bid-cost delta for a given keyword, wherein a bid-cost delta comprises a weighted average difference between a bid and a cost associated with a keyword. A target cost for the keyword is calculated, and the sum of the bid-cost delta and the target cost is calculated, yielding a bid for the keyword.

According to one embodiment of the invention, a target cost of a given keyword is calculated using a target profit margin for the keyword, a revenue associated with the keyword, and a frequency with which one or more advertisements associated with the keyword were selected by one or more users. According to another embodiment of the invention, a target cost of a given keyword is calculated using a target profit margin for the keyword, a revenue associated with the keyword, and a frequency with which one or more advertisements associated with the keyword were displayed to one or more users.

According to a further embodiment of the invention, a target cost of a given keyword is calculated using a target profit margin for the keyword, a revenue associated with the keyword, and a frequency with which one or more actions were taken by one or more users with respect to the one or more advertisements associated with the keyword. According to yet another embodiment, calculating a target cost may comprise identifying a pair of successive occasions on which a user performed an action with respect to a web page corresponding to an advertisement associated with a keyword and identifying a frequency with which the web page corresponding to the advertisement associated with the keyword was viewed by one or more users.

Calculating a target cost may further comprise calculating a conversion rate for a given keyword using the one or more advertising metric values associated with the given keyword. A conversion rate may be calculated for a given keyword using one or more probability distribution techniques, such as one or more statistical estimation, optimization and matching techniques. According to one embodiment, statistical estimation, optimization and matching techniques comprise a maximum likelihood optimization. According to another embodiment, statistical estimation, optimization and matching techniques comprise a moment estimation and matching. According to a further embodiment, a weighted moment estimation and matching may be utilized.

According to one embodiment, calculating a conversion rate comprises updating a calculated conversion rate using one or more update statistical techniques. For example, an update statistical technique may comprise a Bayesian updating method.

The product of the revenue and the difference between the value one ("1") and the target profit margin is calculated. The quotient of the calculated product and a frequency with which one or more advertising metric values associated with one or more advertisements corresponding to the keyword is calculated. According to one embodiment of the invention, the quotient is calculated using the frequency with which one or more users selected one or more advertisements associated with the keyword. According to another embodiment of the invention, the quotient is calculated using the frequency with which one or more advertisements associated with the keyword were displayed to one or more users. According to a further embodiment of the invention, the quotient is calculated using the frequency with which one or more users performed one or more actions with respect to the one or more advertisements associated with the keyword.

The method further comprises aggregating the one or more advertising metric values of the one or more entries associated with a given advertisement group exclusive of the one or more advertising metric values associated with the one or more selected keywords. According to one embodiment, aggregating the one or more advertising metric values comprises identifying the one or more advertising metric values associated with a given advertisement group and removing the one or more advertising metric values associated with the one or more selected keywords.

A bid is generated for the one or more advertisement groups using the one or more aggregated advertising metric values associated with the one or more advertisement groups. According to one embodiment, a bid is generated for a given advertisement group using a bid-cost delta value associated with the advertisement group, an average revenue for the advertisement group, and the average frequency with which one or more advertising metrics associated with the advertisement group have occurred. The average frequency with which one or more advertising metrics have occurred may comprise the average frequency with which one or more advertisements have been selected or displayed to one or more users, as well as the average frequency with which one or more actions associated with one or more advertisements associated with the advertisement group have occurred.

According to one embodiment, the method further comprises discounting the one or more bids associated with the one or more advertisement groups and keywords according to a given time period. For example, the one or more bids may be discounted during a time period of decreased user response to advertisements. The discounting may comprise applying a weight to the one or more bids associated with the one or more advertisement groups and keywords.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF PREFERRED EMBODIMENTS

In the following description, reference is made to the accompanying drawings that form a part hereof, and in which is shown by way of illustration specific embodiments in which the invention may be practiced. It is to be understood that other embodiments may be utilized and structural changes may be made without departing from the scope of the present invention.

Figure 1:
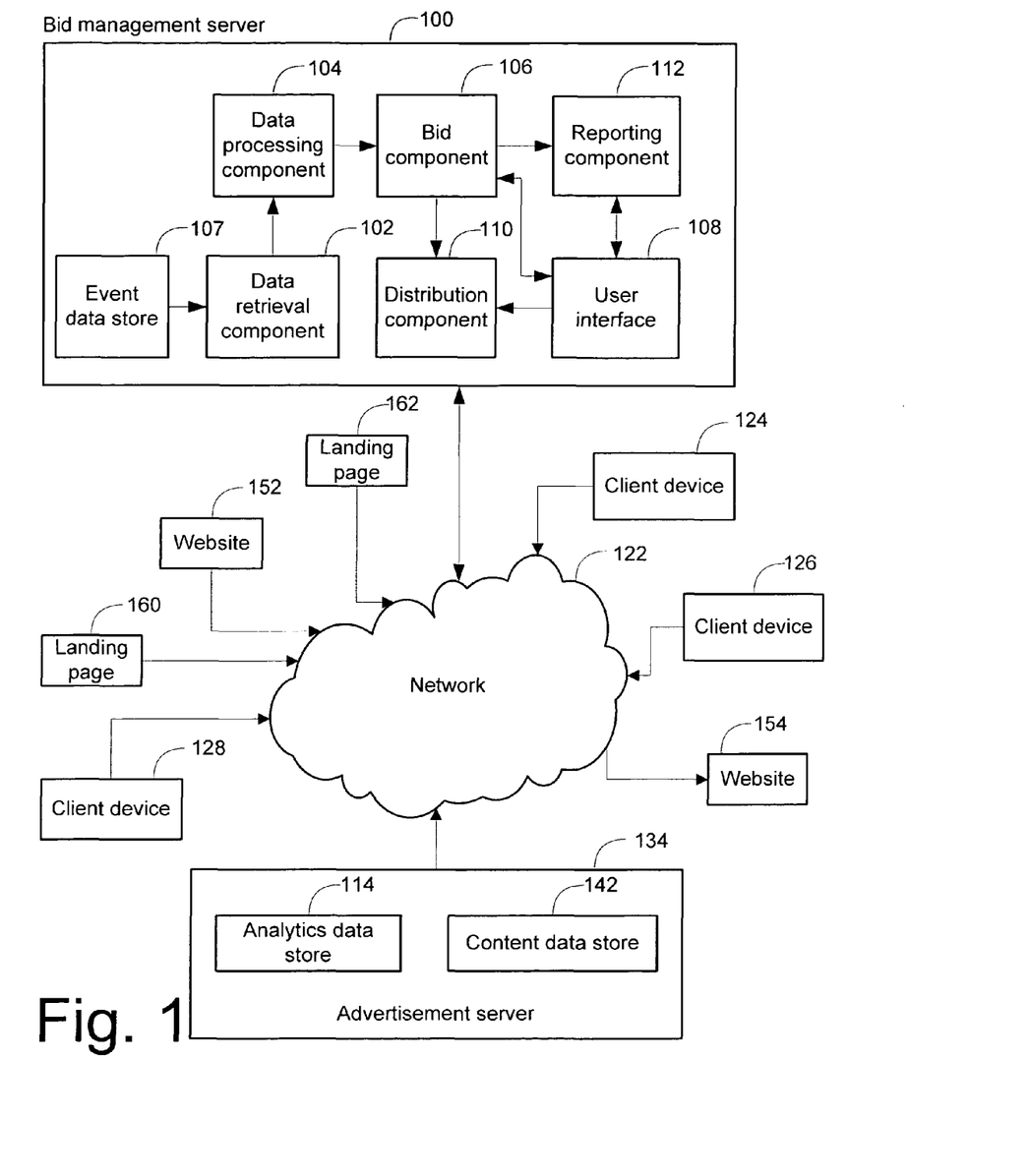
FIG. 1 is a block diagram presenting a system for generating target bids for one or more keywords and one or more advertisement groups according to one embodiment of the present invention.

FIG. 1 presents a block diagram depicting one embodiment of a system for generating one or more target bids for one or more bid objects associated with one or more advertisement groups. According to one embodiment of the invention, a bid object associated with a given advertisement group comprises an object for which an advertiser may provide a bid. For example, a bid object may comprise one or more keywords associated with one or more advertisement groups, wherein an advertiser may bid upon the one or more keywords.

According to the embodiment illustrated in FIG. 1, client devices 124, 126 and 128 are communicatively coupled to a network 122, which may include a connection to one or more local or wide area networks, such as the Internet. According to one embodiment of the invention, a client device 124, 126 and 128 is a general-purpose personal computer comprising a processor, transient and persistent storage devices, input/output subsystem and bus to provide a communications path between components comprising the general-purpose personal computer. For example, a 3.5 GHz Pentium 4 personal computer with 512 MB of RAM, 40 GB of hard drive storage space and an Ethernet interface to a network. Other client devices are considered to fall within the scope of the present invention including, but not limited to, hand held devices, set top terminals, mobile handsets, PDAs, etc.

A user of a client device 124, 126, and 128 communicatively coupled to the network 122 may transmit a search query comprising one or more terms to an advertisement server 134. An advertisement sever 134 may comprise a search provider, such as Google, MSN, AOL, etc., operative to receive one or more search queries comprising one or more terms from one or more client devices 124, 126, and 128. For example, an advertisement server 134 such as Google, AOL, or MSN may provide users of client devices 124, 126, and 128 with the ability to conduct searches via a search engine at a given advertisement server 134 using search queries comprising one or more terms.

A query received from a user of a client device 124, 126, and 128 may comprise one or more terms. For example, the query "wireless notebook computer" contains three terms and may be referred to as a three-term query. Similarly, queries containing only one term are referred to as one-term queries, queries containing two terms are two-term queries, etc. A space or other delimiter character may used to identify the individual terms comprising a given query.

Upon receiving a given search query comprising one or more terms, an advertisement server 134 may search one or more content data stores 142 for one or more advertisements responsive to the one or more terms. A content data store 142 may be operative to maintain one or more advertisements and may comprise one or more accessible memory structures such as a database, CD-ROM, tape, digital storage library, etc. A content data store 142 may be implemented as a relational database or any other type of storage structure capable of providing for the retrieval and storage of a variety of disparate data types.

According to one embodiment of the invention, advertisements maintained in the content data store 142 are maintained according to one or more advertisement groups. The one or more advertisement groups maintained in the content data store 142 are associated with one or more bid objects, such as one or more keywords. The advertisement servers 134 may utilize the one or more keywords comprising a given advertisement group to identify advertisements responsive to a given query received from a client device 124, 126, and 128. For example, the advertisement server 134 may receive a given query from a user of a client device 124, 126, and 128 comprising two terms. The advertisement server 134 may search the content data store 142 to identify one or more advertisement groups associated with one or more keywords that match or are similar to the one or more search terms comprising a query received from the respective user.

The advertisement servers 134 may utilize the one or more keywords to identify advertisements responsive to a given query received from a client device 124, 126, and 128. For example, the advertisement server 134 may retrieve a given query from a user of a client device 124, 126, and 128 comprising two terms. The advertisement server 134 may search the content data store 142 to identify one or more advertisement groups associated with one or more keywords that match or are similar to the one or more search terms received from the respective user.

The one or more advertisement groups maintained in the content data store 142 may be associated with one or more bids. A bid amount for a given keyword or advertisement group provides an indication of the maximum dollar amount to be spent on the one or more advertisements associated with the respective keyword or advertisement. A maximum bid amount may be associated with the keyword or advertisement group, indicating the maximum dollar amount to be spent for a user selection of the one or more advertisements associated with the keyword or advertisement group, the display of the one or more advertisements associated with the keyword or advertisement group, or a user action associated with the one or more advertisements associated with the keyword or advertisement group. The advertisement server 134 may utilize the bids associated with the one or more advertisements groups to select one or more advertisements for distribution to one or more client devices 124, 126, and 128 or to determine a ranking or placement for the one or more advertisements displayed in response to a search query.

Data regarding the advertisements displayed within one or more web pages 152 and 154 and selected by one or more users of client devices 124, 126, and 128 may be retrieved and delivered to an analytics data store 114 at the advertisement server 134. The analytics data store 114 may comprise an accessible memory structure such as a database, CD-ROM, tape, digital storage library, etc. The analytics data store 114 may be operative to maintain analytics data for one or more advertisements associated with one or more advertisement groups. The analytics data store 114 may be implemented as a database or any other type of data storage structure capable of providing for the retrieval and storage of data for one or more advertisements associated with one or more advertisement groups.

Data regarding the advertisements associated with one or more keywords or advertisement groups may comprise data including, but not limited to, the advertisement group with which a given advertisement is associated, the keyword that resulted in the display of a given advertisement, the frequency with which a given advertisement was selected by one or more users, and the frequency with which a given advertisement was displayed within one or more web pages 152 and 154.

As previously described, a user of a client device 124, 126, and 128 may select one or more of the advertisements displayed within a web page 152 and 154 by the advertisement server 134. The selection of an advertisement by a given user of a client device 124, 126, and 128 may result in the user being redirected to a landing page 160 and 162 with which a given advertisement is associated.

According to the embodiment illustrated in FIG. 1, a bid management server 100 communicatively coupled to the network 122 is operative to receive information indicating that a given landing page 160 and 162 associated with a given advertisement was displayed to a user of a client device 124, 126, and 128. The bid management server 100 stores the information associated with a given landing page 160 and 162 displayed in response to the selection of a given advertisement in an event data store 107. The event data store 107 is operative to maintain information indicating the advertisement that resulted in the display of a given landing page, the advertisement group with which the advertisement is associated, as well as the keyword that resulted in the display of the advertisement. The event data store 107 may be implemented as a database or any other type of storage structure capable of providing for the retrieval and storage of data associated with the display of one or more landing pages 160 and 162.

The event data store 107 at the bid management server 100 is further operative to receive and store data associated with a lead, wherein a lead may comprise a request for additional information by a user of a client device 124, 126, and 128 in response to the selection of a given advertisement. For example, a user of a client device 124, 126, and 128 may generate a query comprising the terms "notebook computer." The advertisement server 134 may perform a search of the content data store 142 to identify one or more advertisement groups associated with the keywords "notebook computer." One or more advertisements may be selected as responsive to the terms associated with the user's query and displayed within a web page 152 and 154 on the client device 124, 126, and 128 associated with the user. The user may thereafter select a given advertisement, which may result in the user being redirected to a landing page 160 and 162 associated with the advertisement selected. The user may browse the landing page 160 and 162 page and may wish to request additional information regarding the content displayed or described in the landing page 160 and 162, for example by filling out a form to request additional information. The information provided by the user in response to the selection of the advertisement may comprise a lead.

The information associated with a lead may be delivered to the bid management server 100 and maintained in the event data store 107. According to one embodiment of the invention, the information associated with a lead comprises the advertisement selected that resulted in the lead, the advertisement group to which the advertisement belongs, and the keywords that resulted in the display of the advertisement that resulted in the lead.

The event data store 107 may also store data associated with one or more actions performed by a user of a client device 124, 126, and 128 with respect to a given advertisement or a given landing page 160 and 162 associated with an advertisement. For example, a landing page 160 and 162 displayed in response to the selection of a given advertisement may display one or more additional advertisements that may be selected by a user of a client device 124, 126, and 128. Information indicating the one or more advertisements displayed within a landing page 160 and 162 that are selected by a user of a client device 124, 126, and 128 may be delivered to the event data store 107. Similarly, a landing page 160 and 162 displayed in response to the selection of a given advertisement may allow a user of a client device 124, 126, and 128 to perform various actions, such as purchase a product, register for a newsletter, participate in a survey, etc. Information indicating the one or more actions performed by a user of a client device 124, 126, and 128 with respect to a given landing page 160 and 162 displayed in response to the selection of a given advertisement may be delivered to the event data store 107.

The bid management server 100 is operative to utilize the data maintained in the event data store 107 and the analytics data store 114 to generate target bids for one or more advertisement groups and the one or more keywords associated with the one or more advertisement groups. According to the embodiment illustrated in FIG. 1, a data retrieval component 102 at the bid management server 100 is operative to periodically retrieve analytics data from the advertisement server 134 for the one or more keywords or advertisement groups for which the bid management server 100 has bid upon. For example, the data retrieval component 102 may be operative to retrieve analytics data from the analytics data store 114 for a twenty-four hour period of time for the one or more keywords or advertisement groups for which the bid management server 100 has generated bids. Similarly, the data retrieval component 102 may be operative to retrieve data from the analytics data store 114 on an hourly or other periodic basis for the one or more keywords or advertisement groups for which the bid management server 100 has generated bids.

The analytics data retrieved by the data retrieval component 102 from the analytics data store 114 may comprise the abovementioned analytics data that may be associated with one or more keywords or advertisement groups. For example, the data retrieval component 102 may retrieve data regarding keywords comprising the one or more advertisement groups for which the bid management server 100 has provided bids and the frequency with which the one or more advertisements comprising a given advertisement group were displayed in response to a keyword associated with the advertisement group. Additionally, the data retrieval component 102 may retrieve the frequency with which the one or more advertisements associated with a given keyword were selected, the bids associated with the one or more keywords, and the cost and revenue associated with the one or more keywords.

The data retrieval component 102 is further operative to retrieve the data maintained by the event data store 107 corresponding to the one or more advertisement groups and keywords. The data retrieval component 102 may retrieve information from the event data store 107 indicating the number of landing pages displayed to users of client devices in response to the selection of an advertisement associated with a given keyword. Similarly, the data retrieval component 102 may retrieve information from the event data store 107 indicating the one or more actions performed by one or more users, which may be with respect to a landing page displayed to users in response to the selection of an advertisement associated with a given keyword. For example, the data retrieval component 102 may retrieve information indicating the number of leads, product purchases, advertisements selected, etc., as well as the value generated in response to the one or more actions.

The data retrieved by the data retrieval component 102 for the one or more keywords or advertisement groups for which the bid management server 100 has generated bids is periodically delivered to the data processing component 104 at the bid management server 100. The data processing component 104 is operative to aggregate the data retrieved by the data retrieval component 102 for a given period of time and generate a data set comprising one or more rows identifying the one or more advertising metric values associated with one or more keywords or advertisement groups. For example, the data processing component 104 may retrieve data from the data retrieval component 102 on a daily basis for the one or more keywords or advertisement groups for which the bid management server 100 has generated bids. The data processing component 104 may aggregate the data retrieved for a plurality of days, e.g., a 120 day window, and generate a data set comprising one or more rows indicating the one or more advertising metric values for the aggregated time period.

The data set generated by the data processing component 104 identifies the one or more keywords or advertisement groups for which the bid management server 100 has generated bids. The data set generated by the data processing component 104 further identifies the one or more keywords or one or more advertisement groups, the frequency with which one or more advertisements associated with a keyword were displayed and selected, and the frequency with which one or more landing pages associated with the one or more advertisements were displayed to one or more users of client devices in response to a given keyword. Additionally, the data set identifies the number and type of actions, such as leads, conversions, etc., associated with a given advertisement group or keyword, as well as the revenue and cost associated with a given advertisement group and keyword.

The data set may further identify a bid-cost delta associated with a given advertisement group or keyword. According to one embodiment of the invention, a bid-cost delta comprises the difference between the bid associated with a given keyword or advertisement group and the cost associated with the keyword or advertisement group. As previously described, a bid associated with a keyword or advertisement group may comprise a maximum dollar amount to be spent for a user selection of the one or more advertisements associated with the keyword or advertisement group, a maximum dollar amount to be spent for an impression associated with the one or more advertisements corresponding to the keyword or advertisement group, or a maximum dollar amount to be spent for an action associated with the one or more advertisements associated with the keyword or advertisement group. The cost associated with a keyword or advertisement group comprises the actual dollar amount charged by an advertisement server for a user selection, impression, or action associated with the one or more advertisements associated with the keyword or advertisement group.

The data set generated by the data processing component 104 is delivered to a bid component 106 at the bid management server 100. The bid component 106 is operative to generate a target bid for the one or more advertisement groups identified in the data set, as well as the one or more keywords comprising the one or more advertisement groups. According to one embodiment of the invention, the bid component 106 is operative to traverse the data set generated by the data processing component 104 and select the one or more keywords associated with the greatest advertising metric values for one or more advertising metrics. For example, the bid component 106 may traverse the data set to identify the N keywords with the greatest associated user selections ("clicks.")

According to another embodiment of the invention, the bid component 106 may traverse the data set to identify the N keywords with the greatest associated cost. Alternatively, or in conjunction with the foregoing, the bid component 106 may select the one or more keywords associated with one or more advertising metric values exceeding a given threshold. For example, the bid component 106 may select the one or more keywords associated with a cost exceeding a given threshold. Similarly, the bid component may select the one or more keywords with a "clicks" value (or other metric value) exceeding a given threshold.

The bid component 106 thereafter calculates a target bid for the one or more keywords selected, wherein a target bid comprises an optimal bid amount for a user selection, impression, or action associated with the one or more advertisements associated with a given keyword. The target bid generated by the bid component 106 is derived from a target cost, wherein a target cost is derived from a target margin. According to one embodiment of the invention, a target margin comprises a numerical value identifying a desired profit rate. For example, a target margin may comprise the value thirty-five percent ("35%"), indicating a desired profit margin of 35%.

The target cost of a given selected keyword is calculated using the revenue associated with the selected keyword, as well as the abovementioned target margin. The bid component 106 may utilize the target cost associated with a given selected keyword to generate a target bid for the keyword. According to one embodiment of the invention, a target bid is calculated using the target cost associated with the selected keyword and the bid-cost delta associated with the keyword, as indicated by the data set generated by the data processing component 104. The bid component 106 may generate a target bid for the one or selected keywords using the target cost value and bid-cost delta associated with each respective keyword.

The bid component 106 may thereafter select the one or more rows in the data set not associated with the one or more keywords selected by the bid component 106. The bid component 106 may aggregate the one or more rows in the data set according to the advertisement group to which a given row belongs. According to one embodiment, the bid component 106 aggregates the one or more selected rows according to the advertisement group to which a given row belongs using an "Advertisement Group ID" field associated with a given row. The bid component 106 is operative to calculate an average bid-cost delta and the average revenue for a given advertisement group. The bid component 106 may utilize the average bid-cost delta and the average revenue values to calculate target bids for the one or more advertisement groups according to methods described herein.

According to one embodiment of the invention, the data processing component 104 identifies the one or more keywords or advertisement groups with revenue values below a given threshold. For example, the bid component 106 may identify the one or more keywords or advertisement groups with an associated revenue value of zero ("0"). The one or more keywords or advertisement groups identified by the bid component 106 as associated with a revenue value below a given threshold may be annotated or flagged for manual review. According to one embodiment of the invention, manual target bids are generated for the one or more keywords or advertisement groups with revenue values below a given threshold by a human editor through use of a user interface 108 at the bid management server. The manual review provided by a human editor may identify a target bid, or may modify an existing target bid generated by the bid component 106.

The target bids generated for the one or more keywords and advertisement groups are delivered to a distribution component 110. The distribution component is operative to deliver the one or more bids associated with the one or more keywords and advertisement groups to the advertisement server 134 via the network 122. According to one embodiment of the invention, the distribution component is operative to apply weights to the target bids associated with the one or more keywords and advertisement groups in order to discount the target bids prior to delivering the target bids to the advertisement server 134.

For example, the distribution component may apply a weight to discount the target bids associated with the keywords and advertisement groups on Friday evenings to account for decreased response to advertisements or decreased conversions resulting from user selections of advertisements by users of client devices 124, 126, and 128 during the weekend. Similarly, the distribution component may apply a weight to discount the target bids associated with the keywords and advertisement groups every evening. The weights applied to the target bids may be removed by the distribution component at the conclusion of a given time period. The distribution component may remove the weights applied to one or more keywords and advertisements groups on Monday morning at the conclusion of the weekend.

The target bids generated for the one or more keywords and advertisement groups may also be delivered to a reporting component 112. The reporting component 112 is operative to generate one or more reports, which may be reviewed through use of the user interface 108 at the bid management server 100. According to one embodiment of the invention, the reporting component 112 generates a report indicating the one or more advertising metric values associated with the one or more keywords and advertisement groups as indicated by the abovementioned data set. Alternatively, or in conjunction with the foregoing, the reporting component 112 may generate additional advertising metric values using the data in the abovementioned data set, as well as the target cost and target bid associated with the one or more keywords and advertisement groups.

Those of skill in the art recognize that the system illustrated in FIG. 1 and described above is not limited to generating target bids for keywords, and may be used to generate target bids for one or more bid objects associated with one or more advertisement groups, wherein a bid object comprises an object for which an advertiser may provide a bid. An advertisement server 134 may utilize the one or more bid objects associated with an advertisement group for which one or more target bids have been generated by the bid management server 100 to select and deliver one or more advertisements to users of client devices 124, 126, 128.

Figure 2:
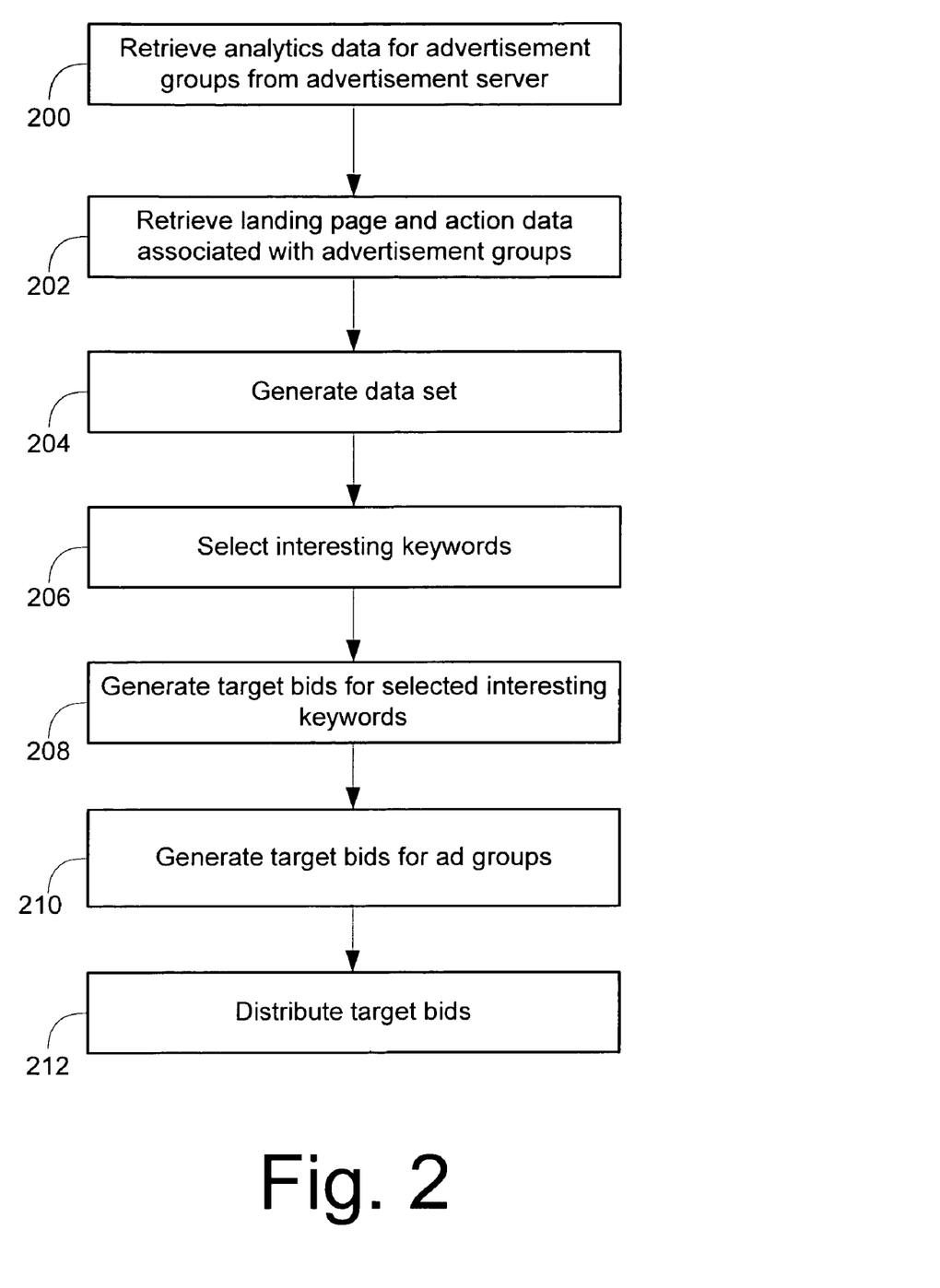
FIG. 2 is a flow diagram presenting a method for generating target bids for one or more keywords and one or more advertisement groups according to one embodiment of the present invention.

FIG. 2 is a flow diagram presenting a method for generating target bids for one or more advertisement groups and one or more bid objects, wherein a bid object, according to the embodiment illustrated in FIG. 2, comprises a keyword. As illustrated in FIG. 2, analytics data for one or more keywords or advertisement groups is retrieved from an advertisement server, such as Google, Yahoo!, MSN, etc., step 200. The analytics data may comprise a frequency with which one or more advertisements associated with a given advertisement group or keyword were displayed to one or more users of client devices in response to a search (e.g., impressions) during a given interval of time, and a frequency with which one or more advertisements associated with a given advertisement group or keyword were selected by one or more users of client devices (e.g., clicks) during a given interval of time. The analytics data may further comprise the cost associated with a given advertisement group or keyword.

Landing page data and action data associated with the one or more advertisement groups and keywords are retrieved, step 202. The landing page data associated with a given advertisement group or keyword may comprise a frequency with which the landing pages were displayed to users of client devices (e.g., landing page views) during a given interval of time. Action data associated with a given advertisement group or keyword may comprise a frequency with which one or more users took one or more actions, which may be with respect to a landing page displayed in response to the selection of advertisement, as well as the value or revenue associated with each respective action. For example, an action associated with a given landing page may comprise a lead, a conversion, the selection of one or more additional advertisements, etc., as well as the value or revenue associated with a given action.

The analytics data, landing page data, and action data are used to generate a data set comprising one or more rows of data, step 204. A given row in the data set identifies one or more advertising metric values for a given interval of time associated with a given keyword, which may be part of an advertisement group. For example, a given row in the data set may identify the number of impressions, clicks, landing page views, leads, as well as the cost and revenue associated with a given keyword for a given interval of time, such as a single day. The generated data set may further indicate the bid-cost delta associated with a given keyword. According to one embodiment of the invention, the bid-cost delta associated with a given keyword comprises the difference between the cost and the bid associated with the keyword.

Table A illustrates an exemplary data set comprising one or more advertising metric values that may be generated for one or more advertisement groups and keywords.

The exemplary data set illustrated in Table A comprises five rows, wherein each row identifies one or more advertising metric values associated with a given advertisement group and keyword for a given interval of time, such as a single day. As illustrated in Table A, a given keyword may be part of an advertisement group. For example, "Ad Group 1" is associated with keywords "Cars" and "SUV." Similarly, "Ad Group 23" is associated with keywords "laptop," "computer," and "notebook."

According to the data set illustrated in Table A, the "Advertisement Group ID" field comprises an identifier or name for a given advertisement group. The "Keyword ID" field identifies a keyword with which a given advertisement group is associated. The "Impressions" field identifies the frequency with which one or more advertisements comprising a given advertisement group were displayed to one or more users of client devices in response to a search comprising a keyword associated with the advertisement group. "Clicks" comprises the frequency with which one or more advertisements associated with a given advertisement group were selected by one or more users of client devices when displayed in response to a search comprising a keyword associated with the given advertisement group.

The "Landing Page Views" field comprises the frequency with which the landing pages associated with the one or more advertisements comprising a given advertisement group were displayed to users of client devices in response to a keyword associated with the advertisement group. "Leads" comprises the frequency with which one or more users provided information via a web page associated with the one or more advertisements comprising an advertisement group in response in response to a keyword associated with the advertisement group. "Revenue" comprises the revenue associated with a given keyword, and cost may comprise the cost per user selection of an advertisement associated with a given keyword, the cost per impression of an advertisement associated with a given keyword, or the cost for a given action associated with an advertisement corresponding to a given keyword.

While the data set in Table A presents a "leads" value associated with a given advertisement group and keyword, those of skill in the art recognize one or more additional actions may be associated with a given advertisement group and keyword. The present example is meant of illustration and is not intended to be limiting For example, a given row in a data set may include a "conversions" value indicating a frequency with which one or more conversions occurred with respect to a given keyword. Similarly, a given row in a data set may include a "browse" value indicating a frequency with which one or more products were viewed by one or more users with respect to a landing page displayed in response to the selection of a given advertisement associated with a keyword.

According to the embodiment illustrated in FIG. 2, one or more interesting keywords in the data set are selected, step

TABLE A

| Advertisement Group ID | Keyword ID | Impressions | Clicks | Landing Page Views | Leads | Cost | Revenue | Bid-Cost Delta |
|---|---|---|---|---|---|---|---|---|
| Ad Group 1 | Cars | 231 | 86 | 16 | 4 | $.23 | $1260.23 | $.02 |
| Ad Group 1 | SUV | 861 | 342 | 56 | 39 | $.45 | $2602.78 | $.04 |
| Ad Group 23 | laptops | 54 | 32 | 21 | 8 | $1.23 | $65.12 | $.02 |
| Ad Group 23 | computer | 86 | 52 | 43 | 21 | $1.23 | $821.44 | $.18 |
| Ad Group 23 | notebook | 1283 | 849 | 658 | 232 | $2.23 | $4382.18 | $.72 |

206. The one or more interesting keywords may comprise the one or more keywords associated with the greatest advertising metric values for one or more advertising metrics. For example, the N keywords with the greatest associated click through rates may be selected, wherein N may comprise a numerical threshold. Alternatively, or in conjunction with the foregoing, the interesting keywords may comprise the N keywords with the greatest associated cost. According to another embodiment of the invention, the interesting keywords may comprise the one or more keywords with one or more advertising metric values exceeding a given threshold. For example, the one or more interesting keywords may comprise the one or more keywords with a "clicks" value or a "cost" value exceeding a given threshold.

Target bids are generated for the one or more selected interesting keywords, step 208. The target bids are calculated using the one or more advertising metric values associated with the one or more selected interesting keywords. Target bids are further calculated for the one or more advertisement groups using the one or more advertising metric values of the one or more keywords associated with a given advertisement group, exclusive of the advertising metric values associated with the one or more interesting keywords.

According to one embodiment of the invention, a check is performed to determine the extent to which the target bids generated for the one or more advertisement groups and keywords differ from previously generated target bids for the one or more advertisement groups and keywords. For example, a check may be performed to determine whether a target bid generated for a given keyword or advertisement group is within ten percent ("10%") of a previously generated bid for the keyword or advertisement group. Similarly, a check may be performed to determine whether the difference between a target bid generated for a given keyword or advertisement group and a previously generated bid for the keyword or advertisement group exceeds thirty percent ("30%"). Alternatively, or in addition, a check may be performed to determine whether the difference between a target bid generated for a given keyword or advertisement group and a previously generated bid for the keyword or advertisement group exceeds five dollars ("$5.00"). According to one embodiment of the invention, the one or more target bids exceeding a difference threshold with respect to a previously generated bid are discarded. Alternatively, or in conjunction with the foregoing, the one or more target bids within a given range of a previously generated target bid for one or more keywords or advertisement groups are discarded. According to another embodiment of the invention, the one or more target bids exceeding a difference threshold with respect to a previously generated bid are reset so as to achieve the difference threshold with respect to a previously generated bid. According to a further embodiment of the invention, the one or more target bids that exceed a difference threshold with respect to a previously generated bid are annotated or flagged for manual review. According to one embodiment of the invention, manual target bids are generated by a human editor to replace the one or more target bids exceeding a difference threshold with respect to a previously generated bid.

According to one embodiment of the invention, a check is performed to determine whether the target bids generated for the one or more advertisement groups and keywords exceed a specified bid ceiling or fall below a specified bid floor. For example, a check may be performed to determine whether a target bid generated for a given keyword or advertisement group exceeds fifty dollars ("$50.00"). Similarly, a check may be performed to determine whether a target bid generated for a given keyword or advertisement group falls below one cent ("$0.10"). According to one embodiment of the invention, the one or more target bids exceeding a bid ceiling are reset to the bid ceiling and the one of more target bids falling below a bid floor are reset to the bid floor. According to a further embodiment of the invention, the one or more target bids exceeding the bid ceiling or falling below the bid floor are annotated or flagged for manual review. According to one embodiment of the invention, manual target bids are generated by a human editor to replace the one or more target bids exceeding the bid ceiling or falling below the bid floor.

The target bids generated for the one or more selected keywords and the one or more advertisement groups are thereafter distributed, step 212. According to one embodiment of the invention, the target bids are distributed to one or more advertisement servers. The bids associated with the one or more keywords and advertisement groups may be used by a given advertisement server to select one or more advertisements associated with a given advertisement group or keyword. Alternatively, or in conjunction with the foregoing, information identifying the target bids generated for the one or more keywords and advertisement groups may be distributed in a report.

The method for generating target bids for one or more keywords and one or more advertisement groups illustrated in FIG. 2 may be periodically performed. According to one embodiment of the invention, target bids are generated for one or more advertisement groups at regular intervals of time. For example, target bids may be generated for one or more advertisement groups and keywords every twenty-four hours. Alternatively, or in conjunction with the foregoing, target bids are generated for one or more advertisement groups and keywords based upon the availability of new or updated analytics data associated with the advertisement groups and keywords.

According to one embodiment of the invention, the one or more interesting keywords selected from a data set may be stored for a given period of time or annotated with persistence information indicating a duration of time for which the interesting keywords are to be considered valid with respect to a given data set. For example, the embodiment presented in FIG. 2 illustrates the selection of interesting keywords each time target bids are generated for the one or more keywords and advertisement groups comprising a data set. In an alternative embodiment, the interesting keywords selected from a data set may be stored and used to generate updated target bids for one or more keywords and advertisement groups for a given period of time.

Figure 3:
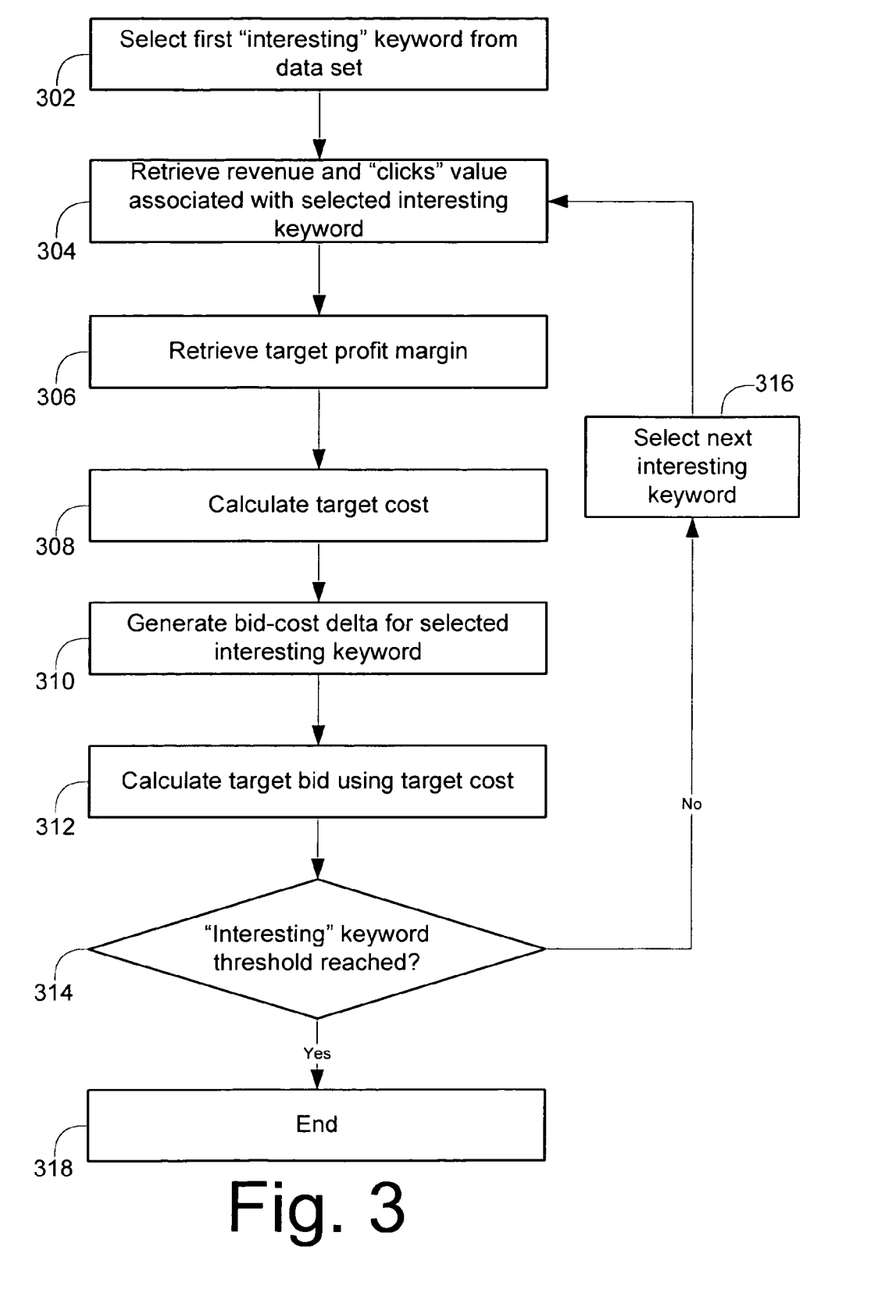
FIG. 3 is a flow diagram presenting a method for generating a target bid for one or more interesting keywords according to one embodiment of the present invention.

FIG. 3 is a flow diagram presenting a method for generating a target bid for the one or more interesting keywords in a given data set. According to the embodiment illustrated in FIG. 3, a first interesting keyword is selected from the data set. The revenue and "clicks" value associated with the selected keyword, as indicated by the data set from which the interesting keyword is selected, is retrieved, step 304. Additionally, a target profit margin value is retrieved, wherein a target profit margin may comprise a numerical value indicating a desired percentage of profit to be earned for a given keyword, step 306.

A target cost is calculated for the selected interesting keyword using the revenue, "clicks" value, and target profit margin retrieved, step 308. Using the "clicks" value associated with a selected interesting keyword may be used for a pay-per-click ("PPC") business model. Table B illustrates one embodiment of an equation that may be used to calculate a target cost for a given interesting keyword selected from a data set.

TABLE B target cost = revenue * (1 − target margin)/click count

In the exemplary equation presented in Table B, "revenue" and "click count" comprises the revenue and the "clicks" value, respectively, associated with a given keyword as indicated by a data set from which the keyword was selected. "Target margin" comprises the abovementioned numerical value indicating a desired profit rate. The target margin, revenue, and "clicks" values may be used to calculate a target cost for a given interesting keyword selected from the data set.

According to one embodiment, the equation to calculate a target cost presented in Table B may be modified in order to incorporate a conversion rate associated with a selected interesting keyword. A probability distribution, such as a binomial distribution, may be used to model the number of observed leads associated with a given interesting keyword and the number of clicks associated with the keyword. For example, the probability of obtaining a lead for a given keyword associated with a given number of clicks may be calculated using a beta-binomial distribution, wherein the input to the beta-binomial distribution may comprise the parameters of a beta distribution and the frequency with which one or more advertisements associated with the keyword were selected (e.g., a clicks value associated with the keyword).

According to one embodiment, a training set of data is selected that identifies the number of clicks and the number of leads for a given keyword. The parameters of the beta distribution that result in the maximum likelihood of the observed data may be identified. According to one embodiment of the invention, a conjugate gradient numerical optimization algorithm is used to identify the one or more optimal parameters of the beta distribution that maximize the likelihood of the observed data. According to another embodiment of the invention, a grid search algorithm is used to identify the one or more optimal parameters of the beta distribution.

The optimal parameters of the beta distribution may also be determined using the quotient of the number of leads associated with the one or more keywords and the number of clicks associated with the one or more keywords. A mean of the conversion rates of the one or more keywords is calculated and weighted according to the number of clicks associated with the one or more keywords. The weighted conversion rate is used to estimate a weighted sample mean. A variance of the conversion rates, weighted by the number of clicks associated with the one or more keywords, is calculated and used to estimate a weighted sample variance. The optimal parameters of the beta distribution may thereafter be estimated by matching the mean and variance with the weighted sample mean and sample variance.

According to a further embodiment, the optimal parameters of the beta distribution are estimated by calculating the quotient of the leads and the clicks values of the one or more keywords. A mean of the conversion rates for the one or more keywords is used to estimate an unweighted sample mean. A variance of the conversion rates is used to estimate an unweighted sample variance. The optimal parameters of the beta distribution may then be estimated by matching the mean and variance of the beta distribution with the unweighted sample mean and sample variance.

Alternatively, or in conjunction with the foregoing, a geometric distribution may be used to model the number of clicks for a lead to be generated for a given keyword. The parameters of the geometric distribution may be modeled using a beta distribution. For example, the probability of observing a given number of clicks for a given keyword before a lead is obtained may be calculated using a beta-geometric distribution, wherein the input to the beta-geometric distribution may comprise the parameters of the beta distribution and the set representing the number of clicks (e.g., the number of times the one or more advertisements associated with the keyword were selected) between successive leads (e.g., successive occasions on which a desired action was taken following the selection of the one or more advertisements associated with the keyword).

According to one embodiment, a training set of data is selected. The training set of data includes one or more keywords associated with one or more leads. Additionally, the one or more keywords in the data set are associated with information indicating the number of clicks between successive leads.

A likelihood of the observed clicks between leads on the training set of data is calculated as a function of the parameters of the beta distribution using a beta-geometric distribution. Parameters of the beta distribution that maximize the likelihood of the observed number of clicks between leads may be identified by using one or more algorithms, including, but not limited to, a conjugate gradient numerical optimization algorithm, or a grid search algorithm.

According to a further embodiment, the optimal parameters of the beta distribution are estimated by identifying a number of clicks between leads. The number of clicks between leads may be weighted by the number of leads and used to estimate a weighted sample mean. A variance of the number of clicks between leads, weighted by the number of leads, may also be used to estimate a weighted sample variance. The optimal parameters of the beta distribution may then be estimated by matching the mean and variance of the beta distribution with the weighted sample mean and sample variance.

The parameters of the beta distribution may also be estimated using an unweighted sample mean of a number of clicks between leads. A variance of the number of clicks between leads is used to estimate an unweighted sample variance. The parameters of the beta distribution may be estimated by matching the mean and variance of the beta distribution with the unweighted sample mean and sample variance.

In addition to the foregoing, the estimate of the keyword conversion rate may be incrementally updated after identifying a given number of leads and clicks for one or more keywords. For example, an estimate of a keyword conversion rate may be incrementally updated after identifying a number of leads and clicks for one or more keywords exceeding a given lead and clicks threshold. The one or more parameters of the beta distribution may be added to the observed number of leads to identify an effective number of leads. The observed number of clicks may be added to the sum of the one or more parameters of the beta distribution to get an effective number of clicks. The updated keyword conversion rate may then be calculated using the quotient of the effective number of leads and the effective number of clicks.

According to another embodiment, one or more parameters of the beta distribution derived from a beta-geometric model are added to the observed number of clicks between leads to calculate an effective number of clicks. The sum of one or more parameters of the beta distribution derived from the beta-geometric model and the numerical value one may be used to calculate an effective number of leads. The updated keyword conversion rate may then be calculated using the quotient of the effective number of leads and the effective number of clicks.

A target cost may be calculated for the selected interesting keyword using the revenue, "leads" value, and target profit margin associated with the keyword, as well as the above-mentioned estimated conversion rate. Table C illustrates a further embodiment of an equation that may be used to calculate a target cost for a given interesting keyword selected from a data set.

TABLE C target cost = revenue * conversion rate * (1 − target margin)/lead count In the equation presented in Table C, "revenue" and "lead count" comprise the revenue and the "leads" value, respectively, associated with a given selected interesting keyword as indicated by a data set from which the keyword was selected. "Target margin" comprises a numerical value indicating a desired profit rate. "Conversion rate" comprises the above-mentioned numerical value indicating an estimated conversion rate for the selected keyword calculated according to methods described herein. The target margin, revenue, "leads," and conversion rate values may be used to calculate a target cost for a given interesting keyword selected from the data set.

Those of skill in the art recognize that the equations presented in Table B and Table C are not limited to use estimating a "clicks-to-lead" conversion rate with respect to a given keyword or advertisement group. The equations presented in Table B and Table C may be applied to estimate one or more action rates associated with a given keyword or advertisement group, wherein an action rate may comprise one or more actions a user may perform with respect to a given keyword. For example, in a pay-per-click ("PPC") model, the equations presented in Table B and Table C may modified so as to estimate a "click-to-action" rate, wherein a click-to-action rate comprises one or more actions that may be performed by a given user with respect to a landing page corresponding to an advertisement associated with a given keyword. Similarly, in a pay-per-impression ("PPM") model, the equations presented in Table B and Table C may modified so as to estimate an "impression-to-action" rate, wherein a impression-to-action rate comprises one or more actions that may be performed by a given user with respect to an advertisement associated with a given keyword displayed to the user.

The bid-cost delta associated with the selected interesting keyword is generated, wherein the bid-cost delta comprises a weighted average difference between the bid and the cost associated with a given keyword, step 310. As previously described, a given row in a data set identifies one or more advertising metric values for a given interval of time for a given keyword, such as the cost for the keyword for a given day, the frequency with which one or more advertisements associated with the keyword were selected by one or more users during the interval of time, the bid associated with the keyword, etc. According to one embodiment of the invention, a bid-cost delta for a given keyword is calculated using the difference between the bid and the cost associated with the keyword for the one or more intervals of time with which the keyword is associated. The difference calculated for a given one of the one or more intervals of time may be weighted according to the number of clicks with which a given interval of time is associated. The quotient of the sum of the weighted differences and the total number of clicks associated with the keyword is thereafter calculated, yielding a bid-cost delta for the given interesting keyword.

According to another embodiment of the invention, a bid-cost delta for a given interesting keyword is calculated using the difference between the bid and the cost associated with the keyword for the one or more intervals of time with which the keyword is associated. The quotient of the sum of the calculated differences for the one or more intervals of time and the total number of intervals of time associated with the keyword is calculated, yielding a bid-cost delta for the interesting keyword.

The bid-cost delta and the target cost are used to calculate a target bid for the selected keyword, step 312. According to one embodiment of the invention, the target bid comprises the sum of the bid-cost delta and the target cost associated with a given keyword.

A check is performed to determine whether an interesting keyword threshold has been reached, step 314. An interesting keyword threshold may comprise a numerical value indicating a maximum number of interesting keywords to be selected from a given data set. For example, an interesting keyword threshold may comprise a value indicating that a maximum of 200 interesting keywords are to be selected from a given data set. Alternatively, or in conjunction with the foregoing, an interesting keyword threshold may comprise a numerical value indicating a minimum value for an advertising metric with which a given keyword must be associated. For example, the check at performed at step 314 may comprise a determination of whether one or more keywords in the data set are associated with one or more advertising metric values exceeding a given threshold. If the interesting keyword threshold has not been reached, a next interesting keyword is selected from the data set, 316. When the interesting keyword threshold is reached, processing terminates, step 318.

While the equation presented in Table B and the embodiment presented in FIG. 3 illustrate the use of the "clicks" value associated with a given selected interesting keyword for a pay-per-click ("PPC") business model, one or more alternative advertising metric values may be used to calculate a target cost for a given interesting keyword selected from a data set. For example, the "impressions" value associated with a given selected interesting keyword may used to calculate a target cost for a given interesting keyword for a pay-per-impression ("PPM") business model. Similarly, a value indicating the frequency of one or more actions associated with a given interesting keyword may be used to calculate a target cost for a given interesting keyword selected from a data set for a pay-per-action ("PPA") business model. Those of skill in the art recognize the one or more advertising metric values associated with a given selected interesting keyword that may be used to calculate a target cost for one or more business models.

Figure 4:
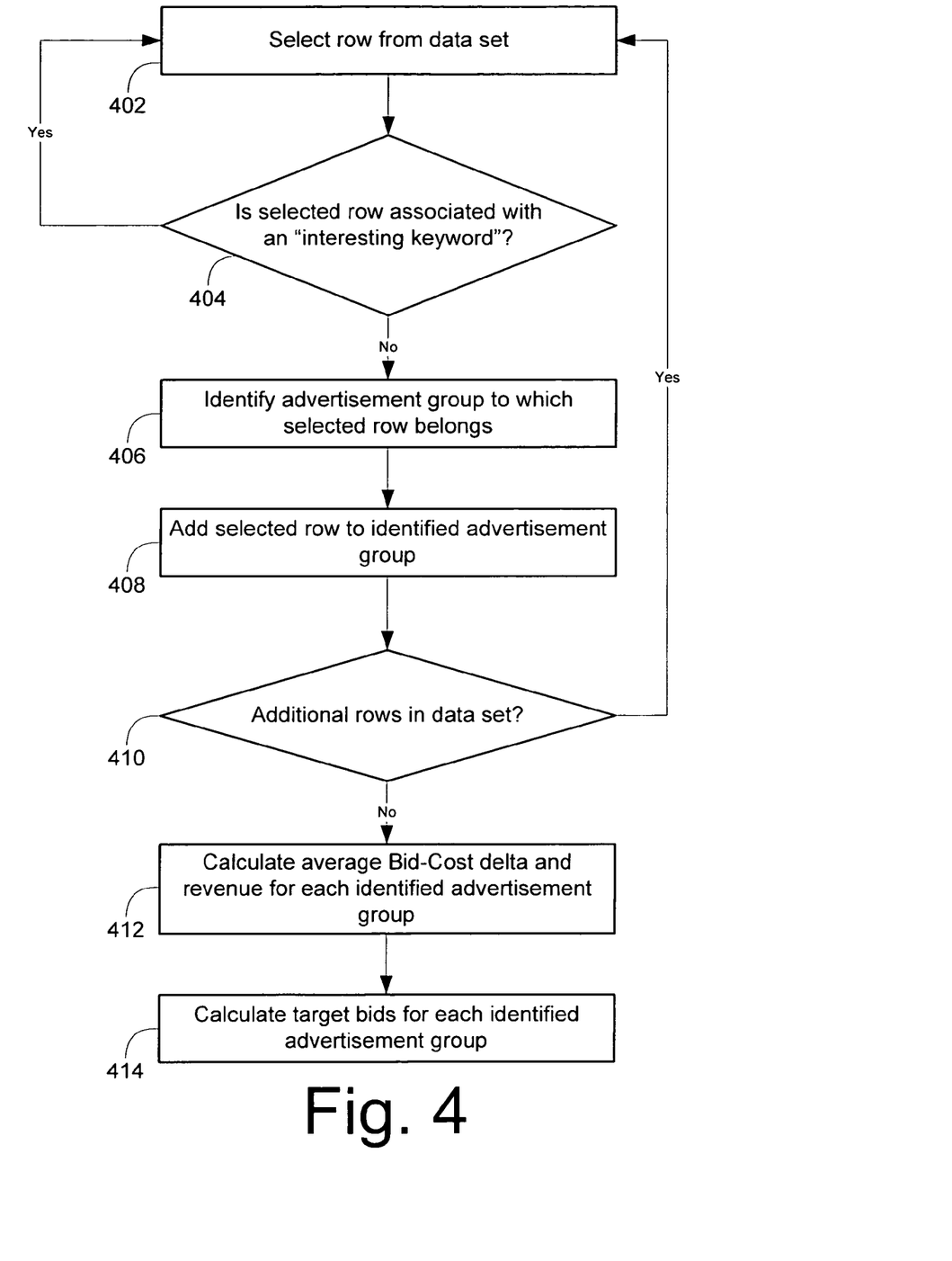
FIG. 4 is a flow diagram presenting a method for generating a target bid for one or more advertisement groups according to one embodiment of the present invention.

FIG. 4 is a flow diagram presenting a method for generating a target bid for one or more advertisement groups using the advertising metric data associated with the one or more keywords not identified as interesting keywords in a given data set. A given row is selected from a data set, wherein a row identifies an advertisement group and a keyword associated with the advertisement group, step 402. A check is performed to determine whether the keyword associated with the row selected comprises an interesting keyword, step 404. If the keyword associated with the row selected comprises an interesting keyword, a next row from the data set is selected, step 402.

If the keyword associated with the row selected does not comprise an interesting keyword, the advertisement group to which the selected row belongs is identified, step 406. The identification of the advertisement group to which a selected row belongs may be performed using the identifier or name of the advertisement group associated with the row selected. The selected row is added to the one or more rows associated with the identified advertisement group, step 408.

A check is performed to determine whether one or more additional rows in the data set require analysis, step 410. If one or more rows in the data set have not been analyzed, a next row from the data set is selected, step 402. After the one or more rows from the data set have been analyzed, the average bid-cost delta, revenue, and number of clicks for a given one of the one or more identified advertisements groups are calculated. The average bid-cost delta associated with a given advertisement group is calculated using the one or more bid-cost delta values and the one or more click count values associated with the one or more rows identified as belonging to a given advertisement group. Similarly, the average revenue associated with a given advertisement group is calculated using the one or more revenue values associated with the one or more rows identified as belonging to a given advertisement group. Additionally, the average click count associated with a given advertisement is calculated using the one or more click count values associated with the one or more rows with which a given advertisement group is associated.

One or more target bids are thereafter calculated for the one or more identified advertisement groups, step 414. As previously described, a target bid is derived from a target cost, which is derived from a target margin. Through use of the equation illustrated in Table B, the target cost associated with a given advertisement group may be calculated using the average revenue and click count associated with the advertisement group. The target bid for the advertisement group may be calculated using the sum of the target cost and the average bid-cost delta associated with the advertisement group. As previously described, the equations presented in Table B and Table C may be modified so as to utilize one or more alternative advertising metric values in order to generate a target cost. For example, the average impression count associated with the one or more rows with which a given advertisement group is associated may be used to generate a target cost. Similarly, the average frequency with which one or more actions associated with the one or more rows with which a given advertisement group is associated may be used to generate a target cost.

The method illustrated in FIG. 4 may be performed upon the exemplary data set illustrated in Table D. With reference to Table D, the one or more interesting keywords may comprise the keyword associated with the greatest click count, e.g., the keyword "SUV," and the keyword associated with the greatest cost, e.g., "vacation." The one or more rows in the data set not associated with the interesting keywords in the data set comprise the "Ad Group 2" row associated with the keyword "laptops," the "Ad Group 4" row associated with the keyword "hotels," and the "Ad Group 4" row associated with the keyword "motels."

The one or more selected rows not associated with interesting keywords may be aggregated according to the advertisement group to which a given row belongs. For example, using the "Advertisement Group ID," the one or more rows associated with "Ad Group 4" may be aggregated. The average bid-cost delta for a given advertisement group, such as "Ad Group 4", may be calculated using the bid-cost delta values of the one or more rows associated with the advertisement group. Similarly, the average revenue for a given advertisement group may be calculated using the revenue values of the one or more rows associated with the advertisement group. Additionally, the average click count for a given advertisement group may be calculated using the click count values of the one or more rows associated with the advertisement group.

The average revenue and average click count associated with a given advertisement group may be used to calculate the target cost for the advertisement group. The target cost may thereafter be used to calculate a target bid for the respective advertisement group.

Figure 5:
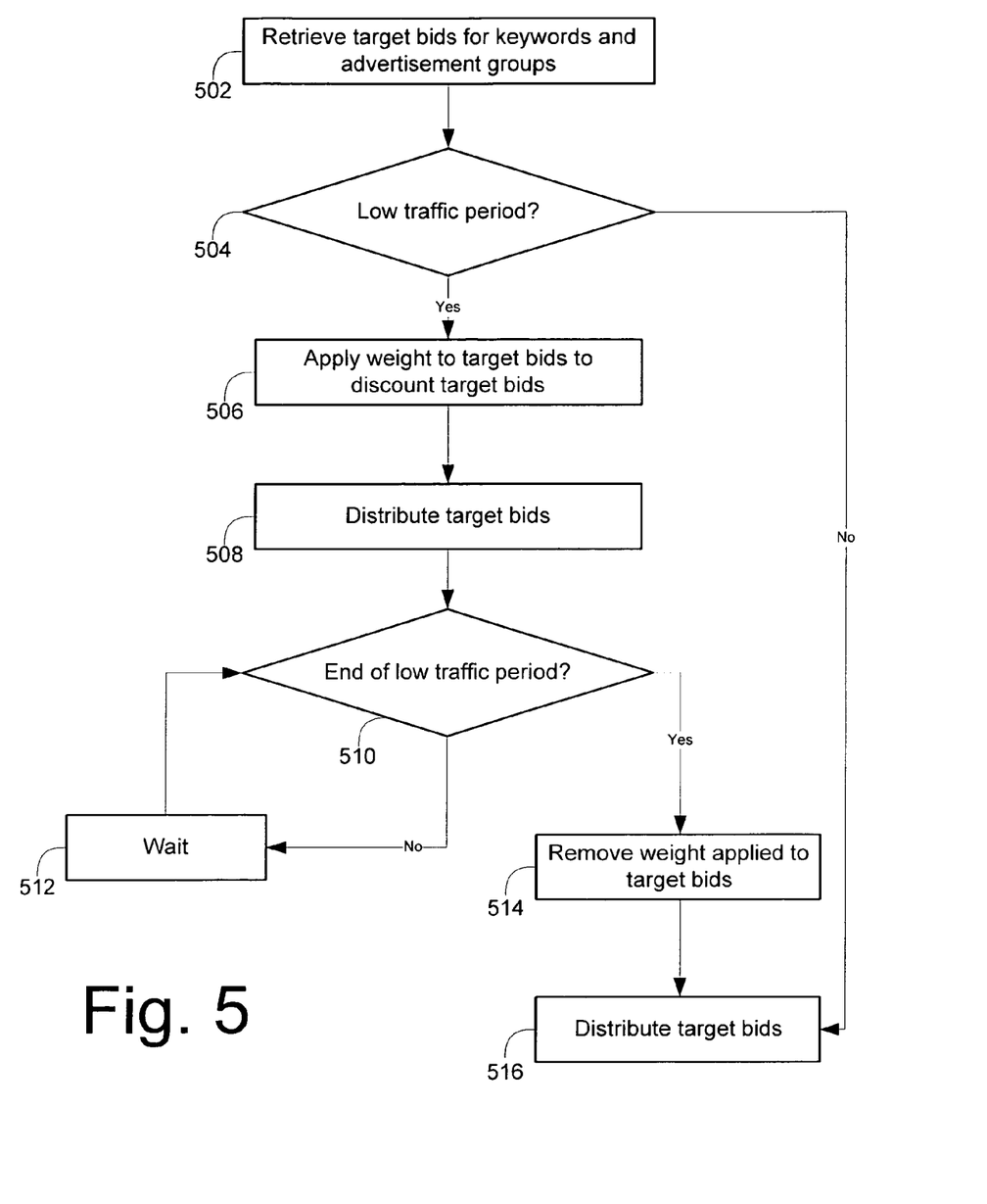
FIG. 5 is a flow diagram presenting a method for distributing one or more target bids for one or more keywords and advertisement groups according to one embodiment of the present invention.

FIG. 5 is a flow diagram presenting a method for distributing one or more target bids for one or more keywords and advertisement groups. According to the embodiment illustrated in FIG. 5, the target bids for one or more keywords and advertisements group are retrieved, step 502. A check is performed to determine whether the time period for which the target bids associated with the one or more keywords and advertisement groups are to be applied comprises a low traffic period, step 504. A low traffic period may comprise a period of time associated with decreased user response to one or more advertisements. For example, users of client devices performing searches via an advertisement server may be less likely to respond to advertisements during the weekend. Similarly, user responses to advertisements may be lower during the hours of 1:00 a.m. through 5:00 a.m. than during the hours of 9:00 a.m. through 12:00 p.m.

If the check at step 504 evaluates to false, the one or more target bids associated with the one or more advertisement groups and keywords are distributed, step 516. According to one embodiment of the invention, the one or more target bids are distributed to an advertisement server operative to utilize the one or more bids to select one or more advertisements responsive to one or more search requests.

If the check at step 504 evaluates to true, indicating that the time period for which the target bids for the one or more keywords and advertisement groups is a low traffic period, a weight is applied to the target bids associated with the one or more keywords and advertisement groups, step 506. According to one embodiment of the invention, the weight is used to discount the target bids associated with the one or more keywords and advertisement groups. For example, a weight may be applied to the one or more target bids in order to reduce the one or more target bids by a fixed percentage.

The discounted target bids are thereafter distributed, step 508. For example, the discounted target bids for the one or more advertisement groups and keywords may be delivered to an advertisement server. A check is periodically performed to determine whether the low traffic period has ended, step 510.

TABLE D

| Advertisement Group ID | Keyword ID | Impressions | Clicks | Landing Page Views | Leads | Cost | Revenue | Bid-Cost Delta |
|---|---|---|---|---|---|---|---|---|
| Ad Group 1 | SUV | 1525 | 342 | 156 | 139 | $.45 | $2602.78 | $.04 |
| Ad Group 2 | laptops | 54 | 32 | 21 | 8 | $1.23 | $65.12 | $.02 |
| Ad Group 3 | vacation | 1040 | 184 | 156 | 140 | $4.23 | $4587.55 | $.10 |
| Ad Group 4 | hotels | 875 | 235 | 154 | 15 | $2.35 | $4452.45 | $1.25 |
| Ad Group 4 | motels | 965 | 152 | 58 | 23 | $1.25 | $9848.52 | $5.54 |

If the low traffic period has not ended, a waiting state is entered, step 512. For example, the low traffic period may comprise the hours from 1:00 a.m. through 6:00 a.m., during which time the target bids of the one or more keywords and advertisement groups are to be discounted. A check may be periodically performed, for example every hour, to determine whether the low traffic period has concluded. If the low traffic period has ended, the weights applied to the one or more target bids are removed, step 514. The target bids are thereafter distributed to one or more advertisement servers, step 516.

FIGS. 1 through 5 are conceptual illustrations allowing for an explanation of the present invention. It should be understood that various aspects of the embodiments of the present invention could be implemented in hardware, firmware, software, or combinations thereof. In such embodiments, the various components and/or steps would be implemented in hardware, firmware, and/or software to perform the functions of the present invention. That is, the same piece of hardware, firmware, or module of software could perform one or more of the illustrated blocks (e.g., components or steps).

In software implementations, computer software (e.g., programs or other instructions) and/or data is stored on a machine readable medium as part of a computer program product, and is loaded into a computer system or other device or machine via a removable storage drive, hard drive, or communications interface. Computer programs (also called computer control logic or computer readable program code) are stored in a main and/or secondary memory, and executed by one or more processors (controllers, or the like) to cause the one or more processors to perform the functions of the invention as described herein. In this document, the terms "machine readable medium," "computer program medium" and "computer usable medium" are used to generally refer to media such as a random access memory (RAM); a read only memory (ROM); a removable storage unit (e.g., a magnetic or optical disc, flash memory device, or the like); a hard disk; electronic, electromagnetic, optical, acoustical, or other form of propagated signals (e.g., carrier waves, infrared signals, digital signals, etc.); or the like.

Notably, the figures and examples above are not meant to limit the scope of the present invention to a single embodiment, as other embodiments are possible by way of interchange of some or all of the described or illustrated elements. Moreover, where certain elements of the present invention can be partially or fully implemented using known components, only those portions of such known components that are necessary for an understanding of the present invention are described, and detailed descriptions of other portions of such known components are omitted so as not to obscure the invention. In the present specification, an embodiment showing a singular component should not necessarily be limited to other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present invention encompasses present and future known equivalents to the known components referred to herein by way of illustration.

The foregoing description of the specific embodiments will so fully reveal the general nature of the invention that others can, by applying knowledge within the skill of the relevant art(s) (including the contents of the documents cited and incorporated by reference herein), readily modify and/or adapt for various applications such specific embodiments, without undue experimentation, without departing from the general concept of the present invention. Such adaptations and modifications are therefore intended to be within the meaning and range of equivalents of the disclosed embodiments, based on the teaching and guidance presented herein. It is to be understood that the phraseology or terminology herein is for the purpose of description and not of limitation, such that the terminology or phraseology of the present specification is to be interpreted by the skilled artisan in light of the teachings and guidance presented herein, in combination with the knowledge of one skilled in the relevant art(s).

While various embodiments of the present invention have been described above, it should be understood that they have been presented by way of example, and not limitation. It would be apparent to one skilled in the relevant art(s) that various changes in form and detail could be made therein without departing from the spirit and scope of the invention. Thus, the present invention should not be limited by any of the above-described exemplary embodiments, but should be defined only in accordance with the following claims and their equivalents.

We claim:

1. A method comprising:
accessing by one or more computer systems advertising information that comprises:
a plurality of keywords that each correspond to an advertising group; and
a plurality of advertising metric values, each of the keywords corresponding to a particular advertising metric value for each of a plurality of advertising metrics;
generating by the one or more computer systems a keyword bid for a first one of the keywords by:
based on the particular advertising metric values corresponding to the first keyword for first particular ones of the advertising metrics:
calculating a target cost for the first keyword representing a desired profit margin for the first keyword; and
calculating a bid-cost delta for the first keyword representing a weighted average difference between the bid and the cost associated with the first keyword; and
combining the target cost for the first keyword with the bid-cost delta for the first keyword;
generating by the one or more computer systems an advertising-group bid for the advertising group by:
for each of second particular ones of the advertising metrics, averaging the particular advertising metric values corresponding to two or more second ones of the keywords for the second particular advertising metric;
based on the averages:
calculating a target cost for the advertising group representing a desired profit for the advertising group; and
calculating a bid-cost delta for the advertising group representing a weighted average difference between the bid and the cost associated with the advertising group; and
combining the target cost for the advertising group with the bid-cost delta for the advertising group; and
communicating by the one or more computer systems the keyword bid for the first keyword and the advertising-group bid for the advertising group for use in bidding on placement of one or more advertisements associated with the first keyword or the advertising group.

2. The method of claim 1, wherein one or more of the advertising metrics each comprises impressions, clicks, landing page views, leads, cost, or revenue.

3. The method of claim 1, wherein calculating the bid-cost delta for the first keyword comprises using a difference between a bid and a cost associated with the first keyword for one or more intervals of time associated with the first keyword.

4. The method of claim 1, wherein combining the target cost for the first keyword with the bid-cost delta for the first keyword comprises calculating a sum of the target cost for the first keyword and the bid-cost delta for the first keyword.

5. The method of claim 1, wherein calculating the bid-cost delta for the advertising group comprises using a difference between a bid and a cost associated with the advertising group for one or more intervals of time associated with the advertising group.

6. The method of claim 1, wherein combining the target cost for the advertising group with the bid-cost delta for the advertising group comprises calculating a sum of the target cost for the advertising group and the bid-cost delta for the advertising group.

7. The method of claim 1, wherein communicating the keyword bid for the first keyword and the advertising-group bid for the advertising group comprises causing the keyword bid for the first keyword and the advertising-group bid for the advertising group to be communicated to an advertisement server operable to use the keyword bid for the first keyword or the advertising-group bid for the advertising group to select one or more advertisements for distribution to one or more clients.

8. The method of claim 1, further comprising selecting by the one or more computer systems the first keyword from the plurality of keywords.

9. The method of claim 8, wherein selecting the first keyword comprises selecting the first keyword if one or more of the particular advertising metric values corresponding to the first keyword satisfy one or more threshold requirements.

10. The method of claim 8, wherein selecting the first keyword comprises selecting the first keyword if one or more of the particular advertising metric values corresponding to the first keyword are greatest advertising metric values for their respective advertising metrics.

11. An apparatus comprising:
a memory comprising instructions executable by one or more processors; and
one or more processors coupled to the memory and operable to execute the instructions, the one or more processors being operable when executing the instructions to:
access advertising information that comprises:
a plurality of keywords that each correspond to an advertising group; and
a plurality of advertising metric values, each of the keywords corresponding to a particular advertising metric value for each of a plurality of advertising metrics;
generate a keyword bid for a first one of the keywords by:
based on the particular advertising metric values corresponding to the first keyword for first particular ones of the advertising metrics:
calculating a target cost for the first keyword representing a desired profit margin for the first keyword; and
calculating a bid-cost delta for the first keyword representing a weighted average difference between the bid and the cost associated with the first keyword; and
combining the target cost for the first keyword with the bid-cost delta for the first keyword;
generate an advertising-group bid for the advertising group by:
for each of second particular ones of the advertising metrics, averaging the particular advertising metric values corresponding to two or more second ones of the keywords for the second particular advertising metric;
based on the averages:
calculating a target cost for the advertising group representing a desired profit for the advertising group; and
calculating a bid-cost delta for the advertising group representing a weighted average difference between the bid and the cost associated with the advertising group; and
combining the target cost for the advertising group with the bid-cost delta for the advertising group; and
communicate the keyword bid for the first keyword and the advertising-group bid for the advertising group for use in bidding on placement of one or more advertisements associated with the first keyword or the advertising group.

12. The apparatus of claim 11, wherein one or more of the advertising metrics each comprises impressions, clicks, landing page views, leads, cost, or revenue.

13. The apparatus of claim 11, wherein calculating the bid-cost delta for the first keyword comprises using a difference between a bid and a cost associated with the first keyword for one or more intervals of time associated with the first keyword.

14. The apparatus of claim 11, wherein combining the target cost for the first keyword with the bid-cost delta for the first keyword comprises calculating a sum of the target cost for the first keyword and the bid-cost delta for the first keyword.

15. The apparatus of claim 11, wherein calculating the bid-cost delta for the advertising group comprises using a difference between a bid and a cost associated with the advertising group for one or more intervals of time associated with the advertising group.

16. The apparatus of claim 11, wherein combining the target cost for the advertising group with the bid-cost delta for the advertising group comprises calculating a sum of the target cost for the advertising group and the bid-cost delta for the advertising group.

17. The apparatus of claim 11, wherein, to communicate the keyword bid for the first keyword and the advertising-group bid for the advertising group, the processors are operable to cause the keyword bid for the first keyword and the advertising-group bid for the advertising group to be communicated to an advertisement server operable to use the keyword bid for the first keyword or the advertising-group bid for the advertising group to select one or more advertisements for distribution to one or more clients.

18. The apparatus of claim 11, wherein the one or more processors are further operable when executing the instructions to select the first keyword from the plurality of keywords.

19. The apparatus of claim 18, wherein, to select the first keyword, the one or more processors are operable when executing the instructions to select the first keyword if one or more of the particular advertising metric values corresponding to the first keyword satisfy one or more threshold requirements.

20. The apparatus of claim 18, wherein, to select the first keyword, the one or more processors are operable when executing the instructions to select the first keyword if one or more of the particular advertising metric values corresponding to the first keyword are greatest advertising metric values for their respective advertising metrics.

* * * * *